(12) United States Patent
Helei

(10) Patent No.: US 12,516,740 B2
(45) Date of Patent: Jan. 6, 2026

(54) VALVE DRIVE AND METHOD OF CLEANING A VALVE

(71) Applicant: Buerkert Werke GmbH & Co. KG, Ingelfingen (DE)

(72) Inventor: Axel Helei, Ingelfingen (DE)

(73) Assignee: BUERKERT WERKE GMBH & CO. KG, Ingelfingen (DE)

( * ) Notice: Subject to any disclaimer, the term of this patent is extended or adjusted under 35 U.S.C. 154(b) by 113 days.

(21) Appl. No.: 18/650,548

(22) Filed: Apr. 30, 2024

(65) Prior Publication Data

US 2024/0369142 A1    Nov. 7, 2024

(30) Foreign Application Priority Data

May 5, 2023    (DE) .......................... 102023111845.5

(51) Int. Cl.
 *F16K 1/44*    (2006.01)
 *F16K 1/48*    (2006.01)

(52) U.S. Cl.
 CPC .............. *F16K 1/446* (2013.01); *F16K 1/487* (2013.01)

(58) Field of Classification Search
 CPC ...... F16K 1/446; F16K 1/486; F16K 31/1221; F16K 35/06; F16K 35/10
 USPC ......... 251/90, 91; 137/269–271, 237–246.23
 See application file for complete search history.

(56) References Cited

U.S. PATENT DOCUMENTS

| | | | | | |
|---|---|---|---|---|---|
| 2,077,997 | A | * | 4/1937 | Hedene | .................... F16K 35/10 137/384 |
| 3,683,954 | A | * | 8/1972 | Press | ..................... F16K 43/008 137/329.06 |
| 5,924,672 | A | * | 7/1999 | Crochet | .............. F16K 31/1221 105/377.07 |

(Continued)

FOREIGN PATENT DOCUMENTS

| | | |
|---|---|---|
| DE | 102007050086 A1 | 4/2009 |
| DE | 102016203557 A1 | 9/2017 |
| DE | 102020110399 A1 | 10/2021 |

*Primary Examiner* — Craig M Schneider
*Assistant Examiner* — Andrew J Rost
(74) *Attorney, Agent, or Firm* — McNees Wallace & Nurick

(57) ABSTRACT

A valve drive is indicated, having a housing, a spindle for displacement between an open position and a closed position and is coupled at one end to a valve closing member, and a return spring which urges the spindle to the closed position or to the open position. The housing has an opening in an area through which the centerline of the spindle extends, and the valve drive includes a closure member to close the opening. The housing and the closure member are configured such that the closure member can be fastened to the housing in an operating position and in a cleaning position to cover the opening. The closure member has a recess on a face side that is on the inside in the operating position, allowing the spindle to move unhindered therein during operation of the valve, and has a fastening structure on the opposite, outside face side. In the cleaning position, the closure member is turned over as compared to the operating position, wherein the fastening structure in the cleaning position allows the spindle to be fastened to the closure member in a form-fitting and/or force-fitting. Furthermore, a method of cleaning a valve is indicated.

12 Claims, 2 Drawing Sheets

(56) References Cited

U.S. PATENT DOCUMENTS

| | | | |
|---|---|---|---|
| 6,007,045 A * | 12/1999 | Heiniger | F16K 7/16 |
| | | | 251/63.5 |
| 8,322,364 B2 * | 12/2012 | Lacasse | F16K 27/0281 |
| | | | 137/271 |
| 8,910,650 B2 | 12/2014 | Andersen et al. | |
| 10,221,996 B2 | 3/2019 | Sauer | |
| 10,989,325 B2 * | 4/2021 | Messerschmidt | F16K 31/1221 |
| 2010/0276004 A1 | 11/2010 | Andersen et al. | |
| 2017/0254474 A1 | 9/2017 | Sauer | |
| 2021/0239234 A1 * | 8/2021 | Eurich | F16K 31/163 |

* cited by examiner

VALVE DRIVE AND METHOD OF CLEANING A VALVE

TECHNICAL FIELD

The disclosure relates to a valve drive, e.g. for a pneumatic valve, and to a method of cleaning a valve. The valve drive includes a housing, a spindle which is mounted in the housing for displacement between an open position and a closed position and is coupled at one end to a valve closing member, and a return spring that urges the spindle to the closed position or to the open position.

BACKGROUND

Valves need to be cleaned on a regular basis, depending on the area of application. This is done, for example, by autoclaving, a sterilization method that is carried out under moist heat. For autoclaving, the valves are removed from a system and disconnected from the compressed air supply. During autoclaving, the valve has to be in an open state. However, valves that are designed as normally closed valves cannot readily be held in the open position after being disconnected from the compressed air supply.

It is known to provide additional auxiliary elements to reliably hold such valves in the open position during cleaning. One such auxiliary element is, for example, a pin that can be inserted through a through-hole in the spindle to lock the spindle in the open position. Typically, a closure member is provided which is releasably fastened to the housing and is removed to obtain access to the spindle.

Furthermore, it is known to screw a sleeve onto the spindle, which has suitable through-holes for a pin in order to lock the spindle in the open position.

A drawback here is that the storage of the auxiliary means results in an increased effort. In addition, there is the risk of the closure member being lost after it has been detached from the valve during cleaning.

Also known are valves in which no closure member is provided and the spindle has two through-holes, with a pin being inserted into a respective through-hole depending on whether the valve is in normal operation or a cleaning process is to be carried out. While this solution prevents the pin from being lost, depending on the installation space situation, there is the risk of pipes getting caught on the pin or being jammed by the pin moving up and down.

The present disclosure provides a valve drive which can be held in an open state in a simple manner even without a supply of compressed air.

SUMMARY

The disclosure provides a valve drive, e.g. for a pneumatic valve, including a housing, a spindle which is mounted in the housing for displacement between an open position and a closed position and is coupled at one end to a valve closing member, and a return spring which urges the spindle to the closed position or to the open position. The housing has an opening in an area through which the centerline of the spindle extends, and the valve drive includes a closure member which is adapted to be inserted into the opening to close the opening. The housing and the closure member are configured such that the closure member can be fastened to the housing in an operating position and in a cleaning position to cover the opening, wherein the closure member has a recess on a face side that is on the inside in the operating position, allowing the spindle to move unhindered therein during operation of the valve, and has a fastening structure on the opposite, outside face side. In the cleaning position, the closure member is turned over as compared to the operating position, so that the outside face side faces the interior of the housing. In the cleaning position, the fastening structure allows the spindle to be fastened to the closure member in a form-fitting and/or force-fitting manner in order to hold the spindle in its open position.

The valve drive according to the disclosure has the advantage that no additional auxiliary element is necessary to hold the spindle in the open position, but that the closure member, which is provided anyway, can be made use of for this purpose. The closure member can be removed before a cleaning process and fastened in a turned position in order to hold the spindle and in this way hold the valve open for cleaning. Since the closure member is adapted to be fastened to the housing both in the operating position and in the cleaning position, the risk of the closure member being lost is minimized.

As the spindle can move into the recess in the operating position, the freedom of movement of the spindle is not impaired by the closure member during operation.

The closure member can be fastened in a form-fitting and/or force-fitting manner to the housing in an operating position and in a cleaning position to cover the opening.

The valve drive can be designed in particular for a normally closed valve. Here, the advantage of the closure member shows an effect in particular.

However, application of the disclosure is not necessarily limited to normally closed valves. The closure member may also be applied in the case of normally open valves, for example to avoid excessive vibration of the spindle during a cleaning process.

The fastening structure is formed as an internal thread in the closure member, for example, and the spindle has a corresponding external thread at its end facing the closure member. The spindle may therefore be screwed to the closure member in order to hold the spindle in the open position. In this way, fastening the spindle to the closure member is particularly simple and can be performed with little effort and without a tool.

The closure member may have an external thread axially on the outer circumference in the area of the recess and the housing may have a corresponding internal thread. This allows the closure member to be screwed to the housing in the operating position, which also permits a particularly simple, tool-free fastening.

According to one embodiment, the closure member is wider in a central portion spaced from the two face sides than in an area adjacent to the face sides, so that two axial, opposite contact surfaces spaced from the face sides are formed on the closure member. In the operating position and in the cleaning position, the closure member rests against the housing by a respective one of the contact surfaces. This means that the closure member can be fastened in a defined position by means of the contact surfaces.

The outside face side is provided, for example, on a section starting from the associated contact surface and projecting into the interior of the housing in the cleaning position. This allows the fastening structure to reach the spindle without difficulty when the closure member is in the cleaning position and the spindle is in the closed position.

Preferably, each contact surface has a seal arranged thereon, e.g. a sealing ring for sealing the closure member against the housing in the operating position and in the cleaning position. The seals prevent dirt, moisture or even gases from being able to enter the interior of the valve drive, e.g. a working chamber.

The closure member may be corrugated on the outer circumference in the axially central portion. This additionally simplifies the screwing and unscrewing of the closure member to and from the housing or the spindle.

According to one embodiment, the closure member is free of a thread adjacent to the outside end face. In this way, the closure member can be manufactured particularly cost-effectively. In a normally closed valve, the closure member is pulled against the housing in the cleaning position, e.g. solely by the return spring, closing the housing in combination with the seal. In this way, a sufficient degree of sealing is achieved in a simple manner to avoid the ingress of liquid in a cleaning process.

The closure member may be designed to be transparent. This makes it possible to check the position of the spindle by means of a visual inspection prior to a cleaning process when the closure member is in the cleaning position. It can be determined whether the spindle is reliably fastened to the closure member.

The object is further achieved according to the disclosure by a method of cleaning a valve having a valve drive according to the disclosure. A first method step involves disconnecting the valve from a compressed air supply after operation, the closure member being in the operating position. This is followed by detaching the closure member from the housing, turning it, and moving the spindle to the open position and fastening it to the closure member by means of the fastening structure. The fastening of the spindle to the closure member is followed by holding the spindle in the open position by the closure member being supported on the housing. The valve is cleaned while the spindle is held in the open position by the closure member.

As already described in connection with the valve drive, the method according to the disclosure has the advantage that the valve can be held in an open state particularly easily for cleaning purposes without any additional auxiliary elements being required.

Before being fastened to the closure member, the spindle is moved to the open position, for example manually or by means of an auxiliary device.

DETAILED DESCRIPTION

Figure 1:
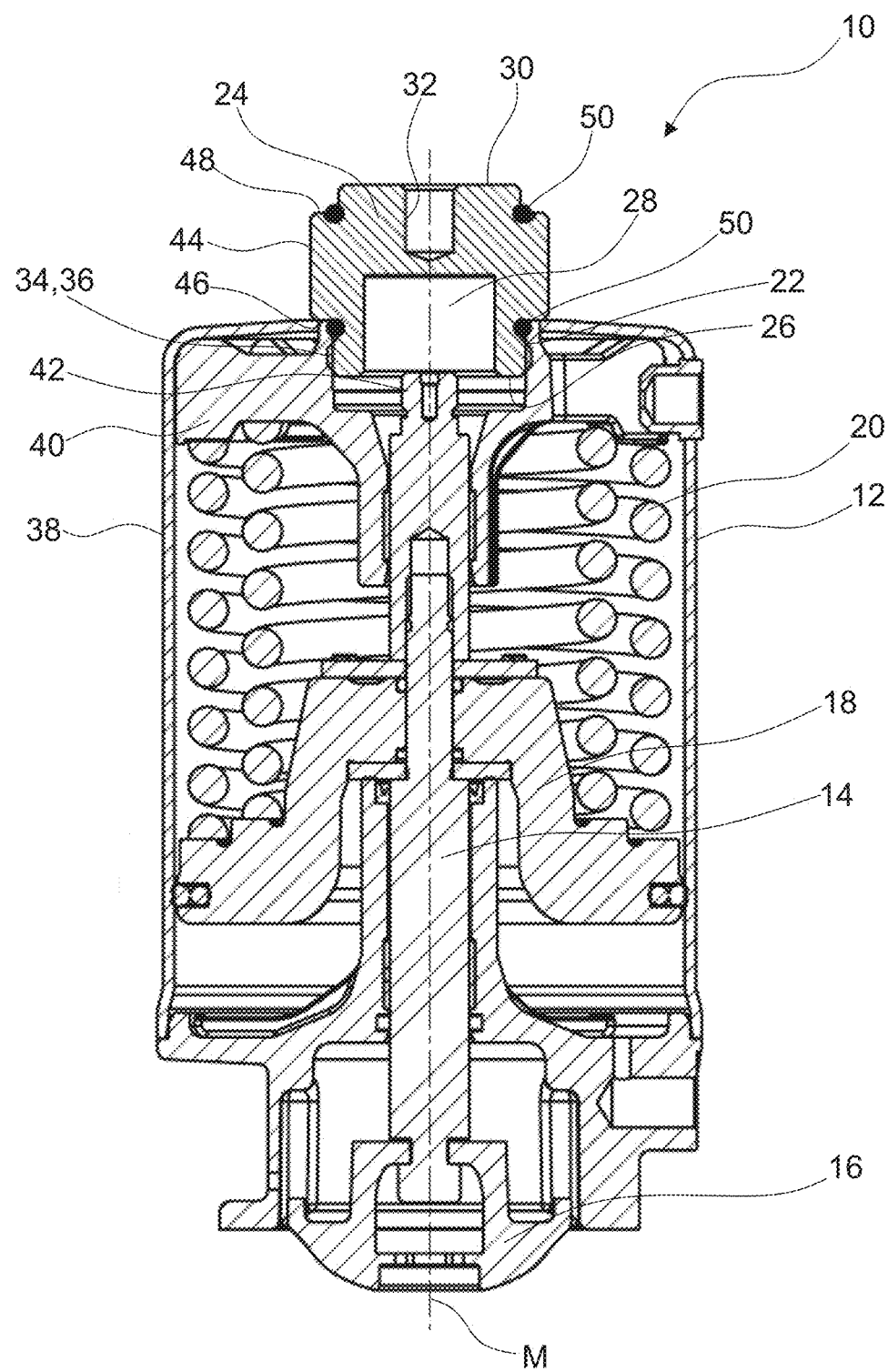
FIG. 1 shows a sectional view of a valve drive according to the disclosure, with the valve drive being in a closed state.

FIG. 1 shows a valve drive 10, e.g. for a pneumatic valve. The valve drive 10 illustrated in FIG. 1 is a normally open drive.

The valve drive 10 comprises a housing 12, which is cup-shaped.

A spindle 14 is mounted in the housing 12 and can be displaced between an open position and a closed position. In FIG. 1, the spindle 14 is shown in a closed position.

At one end, the spindle 14 is coupled to a valve closing member 16, which is adapted to cooperate with a valve seat of a valve in order to close the valve.

In the exemplary embodiment, the spindle 14 is composed of two sections fastened to each other. It is, however, also conceivable that the spindle 14 is formed in one piece.

Fastened to the spindle 14 is a piston 18, which is guided on a sliding surface of the housing 12.

The piston 18 divides the housing 12 into two working chambers, which can be suitably acted upon by compressed air to displace the spindle 14.

Furthermore, a return spring 20 is provided, which urges the spindle 14 to the closed position. In the exemplary embodiment, the return spring 20 acts on the piston 18, which is firmly fixed to the spindle 14.

The housing 12 has an opening 22 in an area through which the centerline M of the spindle 14 extends.

A closure member 24 is inserted in the opening 22 for closing the opening 22. The closure member 24 is, for example, an injection molded part.

For example, the closure member 24 is made from a transparent material.

When the closure member 24 is inserted in the opening 22, it prevents dirt, liquids or gases from entering the housing 12.

The housing 12 and the closure member 24 are configured such that the closure member 24 can be fastened to the housing 12 in two different positions, e.g. in a form-fitting and/or a force-fitting manner.

More precisely, the closure member 24 is adapted to be fastened to the housing 12 in an operating position and in a cleaning position to cover the opening 22.

In FIG. 1, the closure member 24 is fastened to the housing 12 in the operating position.

Here, the closure member 24 protrudes into the housing 12.

The closure member 24 has a recess 28 on a face side 26 that is on the inside in the operating position.

The spindle 14 can move in the recess 28 unhindered during operation of the valve. This also becomes clear when compared with FIG. 2, which shows the spindle in an open position. In the open position, the spindle 14 extends axially into the recess 28.

On the opposite, outside face side 30, the closure member 24 has a fastening structure 32.

Figure 3:
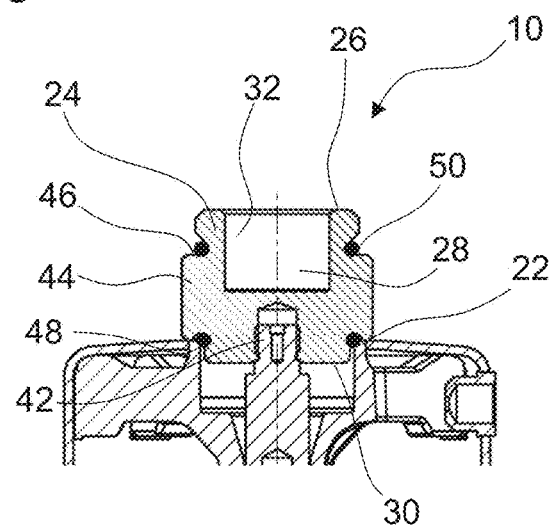
FIG. 3 shows the valve drive from FIGS. 1 and 2 in the area of the closure member in a cleaning state.

In the cleaning position of the closure member 24, the fastening structure 32 allows the spindle 14 to be fastened to the closure member 24 with a form fit and/or a force fit in order to hold the spindle 14 in the open position, as illustrated in FIG. 3.

In the cleaning position, the closure member 24 is turned over as compared to the operating position, so that the outside face side 30 faces the interior of the housing.

For fastening the closure member 24 in the operating position, the closure member 24 has an external thread 34 axially on the outer circumference in the area of the recess 28. The housing 12 has a matching internal thread 36.

In the exemplary embodiment, the housing 12 comprises a thin-walled housing part 38 and an insert 40 on which the internal thread 36 is formed. It is, however, also possible to manufacture the housing 12 in one piece.

The fastening structure 32 is formed as an internal thread in the closure member 24.

The spindle 14 has a corresponding external thread 42 at its end facing the closure member 24.

In a central portion 44 spaced from the two face sides 26, 30, the closure member 24 is wider than in an area adjacent to the face sides 26, 30, so that two axial, opposite contact surfaces 46, 48 spaced from the face sides 26, 30 are formed on the closure member 24.

The contact surfaces 46, 48 serve to position the closure member 24 in a defined position.

Figure 2:
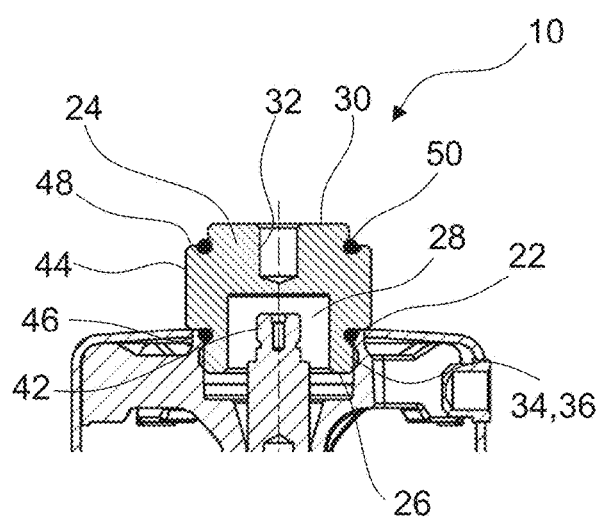
FIG. 2 shows the valve drive from FIG. 1 in the area of a closure member, with the valve drive being in an open state.

More precisely, in the operating position and in the cleaning position of the closure member 24, a respective one of the two contact surfaces 46, 48 rests against the housing, as is apparent from FIGS. 1 to 3.

When the closure member 24 has been screwed onto the spindle 14 in the cleaning position, as shown in FIG. 3, the spindle 14 is held in the open position.

Here, the closure member 24 is urged against the housing 12 by the return spring 20.

Adjacent to the outside face side 30, the closure member 24 may therefore be free of a thread, since the necessary contact pressure is already generated by the return spring 20. In the cleaning position, the closure member 24 is thus held exclusively by the spindle 14.

The outside face side 30 is provided on a section starting from the associated contact surface 48 and projecting into the interior of the housing in the cleaning position.

In the axially central portion 44, the closure member 24 is corrugated on the outer circumference.

A seal 50 is arranged on each contact surface 46, 48 for sealing the closure member against the housing in the operating position and in the cleaning position.

In the exemplary embodiment, the seals 50 are embodied by sealing rings.

Figure 4:
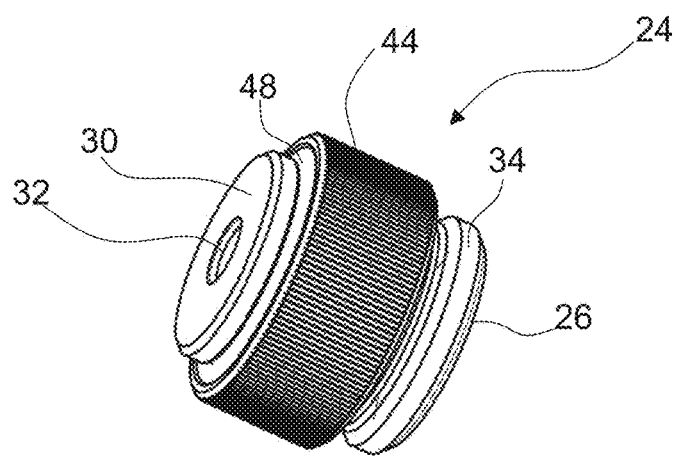
FIG. 4 shows a closure member of the valve drive.

FIG. 4 shows the closure member 24 in an additional perspective view.

Handling of the closure member 24 will become clear below by reference to the description of a method of cleaning a valve according to the disclosure.

In order to clean a valve having a valve drive 10 as illustrated in FIGS. 1 to 3, the valve is first disconnected from a compressed air supply after operation.

Until then, the closure member 24 has been in the operating position, as is illustrated in FIGS. 1 and 2.

After disconnection from the compressed air supply, the spindle 14 is in the closed position.

Subsequently, the closure member 24 is detached from the housing 12 and turned over.

The spindle 14 is moved to the open position, for example by applying pressure to the valve closing member 16.

When the spindle is in the open position, the spindle 14 is fastened to the closure member 24 by means of the fastening structure 32. Specifically, the closure member 24 is screwed onto the spindle 14.

The closure member 24 is now in the cleaning position.

The spindle 14 is then held in the open position by the closure member 24 being supported on the housing 12, as illustrated in FIG. 3. The closure member rests against the housing 12 by its contact surface 48.

Then the valve is cleaned while the spindle 14 is held in the open position by the closure member 24.

When the cleaning process has been completed, the closure member 24 is released from the spindle 14. The spindle 14 then moves back to the closed position.

The closure member 24 is turned over and fastened, e.g. screwed, to the housing 12 in its operating position. In doing so, the closure member 24 is inserted or screwed into the opening 22 until the contact surface 46 comes to rest against the housing 12.

The valve is now ready for use in regular operation again.

The invention claimed is:

1. A valve drive comprising a housing, a spindle which is mounted in the housing for displacement between an open position and a closed position and is coupled at one end to a valve closing member, and a return spring which urges the spindle to the closed position or to the open position, wherein the housing has an opening in an area through which the centerline of the spindle extends, and the valve drive includes a closure member which is adapted to be inserted into the opening and closes the opening, wherein the housing and the closure member are configured such that the closure member can be fastened to the housing in an operating position and in a cleaning position to cover the opening, and wherein the closure member has a recess on a face side that is on the inside in the operating position, allowing the spindle to move unhindered therein during operation of the valve, and has a fastening structure on the opposite, outside face side, wherein in the cleaning position, the closure member is turned over as compared to the operating position, so that the outside face side faces the interior of the housing, wherein the fastening structure in the cleaning position allows the spindle to be fastened to the closure member in a form-fitting and/or force-fitting manner in order to hold the spindle in its open position.

2. The valve drive according to claim 1, wherein the closure member can be fastened in a form-fitting and/or a force-fitting manner to the housing in an operating position and in a cleaning position to cover the opening.

3. The valve drive according to claim 1, wherein the fastening structure is formed as an internal thread in the closure member and the spindle has a corresponding external thread at its end facing the closure member.

4. The valve drive according to claim 1, wherein the closure member has an external thread axially on the outer circumference in the area of the recess and the housing has a corresponding internal thread.

5. The valve drive according to claim 1, wherein the closure member is wider in a central portion spaced from the two face sides than in an area adjacent to the face sides, so that two axial, opposite contact surfaces spaced from the face sides are formed on the closure member.

6. The valve drive according to claim 5, wherein the outside face side is provided on a section starting from the associated contact surface and projecting into the interior of the housing in the cleaning position.

7. The valve drive according to claim 5, wherein each contact surface has a seal arranged thereon.

8. The valve drive according to claim 7, wherein the seal is a sealing ring for sealing the closure member against the housing in the operating position and in the cleaning position.

9. The valve drive according to claim 5, wherein the closure member is corrugated on the outer circumference in the axially central portion.

10. The valve drive according to claim 1, wherein adjacent to the outside end face, the closure member is free of a thread.

11. The valve drive according to claim 1, wherein the closure member is transparent.

12. A method of cleaning a valve having a valve drive comprising a housing, a spindle which is mounted in the housing for displacement between an open position and a closed position and is coupled at one end to a valve closing member, and a return spring which urges the spindle to the closed position or to the open position, wherein the housing has an opening in an area through which the centerline of the spindle extends, and the valve drive includes a closure member which is adapted to be inserted into the opening and closes the opening, wherein the housing and the closure member are configured such that the closure member can be fastened to the housing in an operating position and in a cleaning position to cover the opening, and wherein the closure member has a recess on a face side that is on the inside in the operating position, allowing the spindle to move unhindered therein during operation of the valve, and has a fastening structure on the opposite, outside face side, wherein in the cleaning position, the closure member is turned over as compared to the operating position, so that the outside face side faces the interior of the housing, wherein the fastening structure in the cleaning position allows the spindle to be fastened to the closure member in a form-fitting and/or force-fitting manner in order to hold the spindle in its open position, the method comprising the steps of:

- disconnecting the valve from a compressed air supply after an operation, the closure member being in the operating position;
- detaching the closure member from the housing and turning it;
- moving the spindle to the open position and fastening it to the closure member by means of the fastening structure;
- holding the spindle in the open position by the closure member being supported on the housing; and
- cleaning the valve while the spindle is held in the open position by the closure member.

\* \* \* \* \*